(12) United States Patent
Kothmann (10) Patent No.: US 6,648,272 B1
(45) Date of Patent: Nov. 18, 2003

(54) AIRSHIP

(76) Inventor: Keith L. Kothmann, 102 Meadowhill Ct., Fort Worth, TX (US) 76108

( * ) Notice: Subject to any disclaimer, the term of this patent is extended or adjusted under 35 U.S.C. 154(b) by 0 days.

(21) Appl. No.: 10/164,780

(22) Filed: Jun. 7, 2002

Related U.S. Application Data (60) Provisional application No. 60/301,670, filed on Jun. 28, 2001.

(51) Int. Cl.⁷ .................................................. B64B 1/58
(52) U.S. Cl. ........................................... 244/97; 244/30
(58) Field of Search .............................. 244/30, 31, 97, 244/98, 125, 128, 115

(56) References Cited

U.S. PATENT DOCUMENTS

| | | | | |
|---|---|---|---|---|
| 1,656,780 A | * | 1/1928 | Diago | 244/24 |
| 1,755,359 A | * | 4/1930 | Moses | 244/97 |
| 3,321,156 A | | 5/1967 | McMasters | |
| 3,801,044 A | * | 4/1974 | Moore | 244/5 |
| 4,174,081 A | * | 11/1979 | Sardanowsky | 244/17.17 |
| 4,326,681 A | | 4/1982 | Eshoo | |
| 5,110,070 A | * | 5/1992 | Hagenlocher et al. | 244/125 |
| 5,251,850 A | * | 10/1993 | Noren | 244/128 |
| 5,713,536 A | | 2/1998 | Bata | |
| 5,755,402 A | * | 5/1998 | Henry | 244/29 |
| 5,931,413 A | * | 8/1999 | Hayashi | 244/32 |
| 6,182,924 B1 | | 2/2001 | Nott | |
| 6,196,498 B1 | | 3/2001 | Eichstedt et al. | |
| 6,286,783 B1 | | 9/2001 | Kuenkler | |
| 6,293,493 B1 | | 9/2001 | Eichstedt et al. | |
| 6,305,641 B1 | | 10/2001 | Onda | |
| 6,427,943 B2 | * | 8/2002 | Yokomaku et al. | 244/30 |
| 2002/0179771 A1 | * | 12/2002 | Senepart | 244/97 |

FOREIGN PATENT DOCUMENTS

| | | | | |
|---|---|---|---|---|
| WO | WO-01/42082 A1 | * | 6/2001 | B64B/1/70 |

OTHER PUBLICATIONS

United States patent application Publication No. US 2001/0002686 A1 dated Jun. 7, 2001, Inventor: Yokomaku et al., 20 pages.

Craig C. Freudenrich, *How Blimps Work*, 9 pages, 2002, www.howstuffworks.com.

\* cited by examiner

*Primary Examiner*—Peter M. Poon
*Assistant Examiner*—Timothy D. Collins
(74) *Attorney, Agent, or Firm*—Geoffrey A. Mantooth (57) ABSTRACT

An airship has a gas bag for containing lifting gas, which gas bag is located within an outer envelope. The envelope, made of flexible material, is made rigid by the pressure of the gas in the gas bag. A hollow ring surrounds the gas bag and is coupled to the envelope as well as support decking located below the gas bag. On one of the decks is located a propulsion unit and horizontal and vertical control surfaces. Vertical flight is controlled with the control surfaces as well as by moving gas in and out of the gas bag. The gas from the gas bag is stored within the hollow ring. Vertical flight is also controlled by an expandable diaphragm located below the gas bag; when inflated, the diaphragm compresses the gas bag. Vertical flight is also controlled by adjusting the top shape of the envelope so as to compress the gas bag. When the airship is on the ground, a suction between the deck and the ground maintains the airship in a parked condition.

7 Claims, 10 Drawing Sheets

AIRSHIP

This application is a continuation-in-part application of Ser. No. 60/301,670, filed Jun. 28, 2001.

FIELD OF THE INVENTION

The present invention relates to aircraft, and in particular to semi-buoyant and lighter-than-air aircraft.

BACKGROUND OF THE INVENTION

Airships are one type of lighter-than-air (LTA) craft. LTA craft utilize small molecular gases (such as helium or hydrogen) or hot air to generate lift.

The lifting gas is contained in an envelope or gas bag. The envelope is typically made of laminated fabrics and other materials such as urethane and rubber. One problem with conventional envelopes is leaking of the lifting gas by way of migration through the envelope walls. Some manufacturers of LTA craft make their own envelopes utilizing proprietary compositions and techniques. These envelopes tend to be expensive and also heavy. In addition, the lifting gases that are contained inside the envelope are carefully controlled to be at or near atmospheric pressure in order to reduce leakage.

The lower pressures of the lifting gas in the envelope also limits the air speed attainable by an LTA craft. This is because at relatively high air speeds, the forward nose of the craft experiences "dimpling", wherein the nose is pushed into a concave form by the wind load. One type of LTA craft is a blimp, which utilizes a cigar-shaped envelope. The nose on a blimp uses battens in order to stiffen the nose, but such devices still do not allow relatively high air speeds.

Furthermore, many conventional LTA craft must often discharge lifting gas in order to land and to change altitude. For example, Nott, U.S. Pat. No. 6,182,924, teaches a ballast control method for an airship by means of onboard tanks of compressed liquefied lifting gas that are expelled into the airship through a heat exchanger. Nott relies on an onboard supply of liquefied lifting gas for ballast adjustment, but also requires the subsequent purging of the gas for descent control. Consequently, these LTA craft have an airborne endurance of only a few hours. When the craft is on the ground, the helium supply must be replenished.

Furtherstill, changes in solar heating upon the envelope causes changes in lifting gas pressure. For example, if the craft begins operation during the night, daylight heating causes the pressure of the lifting gas to increase. Consequently, conventional LTA craft may not be able to maintain flight through a daylight-to-darkness cycle.

Still another problem experienced by conventional LTA craft is landing and subsequent mooring to a fixed mast or anchoring system. The mast or anchoring system is unique to the particular craft. Because of the uniqueness of the anchoring system and the need for a supply of lifting gas, landing facilities for LTA craft can be expensive.

Some additional prior art patents are McMasters, U.S. Pat. No. 3,321,156, which teaches a discoid shaped airship augmented by a buoyant gas in a toroidal gas bag surrounding a centrally disposed engine having an upward facing inlet and a downward facing outlet. The engine is gimbaled for tilting motion relative to the vertical axis. Eshoo, U.S. Pat. No. 4,326,681, teaches a saucer or disc-shaped flexible airship augmented by buoyant gas contained in a plurality of chambers surrounded by an annular pressurized tube and symmetrically disposed around a central chamber, which can be charged or discharged with hot air to allow manipulation of vertical movement. Eshoo also teaches a saucer or disc-shaped flexible airship showing an inflatable annular tube intended to provide a horizontal structural component for the shape of the craft where the vertical forces are transmitted through the central chamber. Henry, U.S. Pat. No. 5,755,402, teaches an airship of nearly neutral buoyancy, toroidal in shape, and with a centrally located downward facing engine thrust, from which thrust is directed by a gate valve arrangement into a manifold of ducts that discharge at the periphery of the aircraft to maintain horizontal and vertical movement.

SUMMARY OF THE INVENTION

It is an object of the present invention to provide an airship that minimizes the need for service and replenishment of lifting gas.

It is another object of the present invention to provide an airship that controls vertical flight without venting lifting gas.

It is a further object of the present invention to provide an airship that is easily and inexpensively controlled.

It is a further object of the present invention to provide an airship that can attain high speeds.

The present invention provides an airship that comprises a gas bag for containing lifting gas. The gas bag is located within an outer envelope. There is provided a reservoir of compressed lifting gas, with the reservoir being in selective communication with the gas bag. A compressor compresses the lifting gas from the gas bag and provides it to the reservoir. A controller moves the lifting gas from the reservoir to the gas bag.

In accordance with one aspect of the present invention, the reservoir comprises a hollow ring located around the gas bag. The ring is coupled to the envelope. The ring supports a deck located below the gas bag.

In accordance with another aspect of the present invention, the deck comprises a propulsion unit and vertical and horizontal flight control surfaces.

In accordance with still another aspect of the present invention, there is provided means for providing a suction between the deck and the ground for landing.

In accordance with still another aspect of the present invention, the envelope comprises a flexible sheet material.

In accordance with still another aspect of the present invention, the airship comprises a rigid frame located below the gas bag. An expandable diaphragm is located between the rigid frame and the gas bag. An air injector expands the diaphragm and compresses the gas bag.

In accordance with still another aspect of the present invention, there is provided means for changing the shape of a top of the flexible envelope.

The present invention also provides an airship comprising a gas bag for containing lifting gas. The gas bag is located within a flexible envelope. A compression ring is located around the gas bag, with the ring being coupled to the envelope so as to support lifting loads produced by the gas bag on the envelope. A deck is located below the gas bag with the deck being coupled to the ring by the envelope so as to be supported by the ring.

In accordance with one aspect of the present invention, the deck comprises a propulsion unit and vertical and horizontal flight control surfaces.

In accordance with another aspect of the present invention, there is provided a rigid frame located below the gas bag and above the rigid deck. An expandable diaphragm is located between the rigid frame and the gas bag. An air injector provides air into the diaphragm for expanding the diaphragm and compressing the gas bag.

In accordance with still another aspect of the present invention, there is provided means for providing a suction between the deck and the ground for landing.

DESCRIPTION OF THE PREFERRED EMBODIMENT

Figure 1:
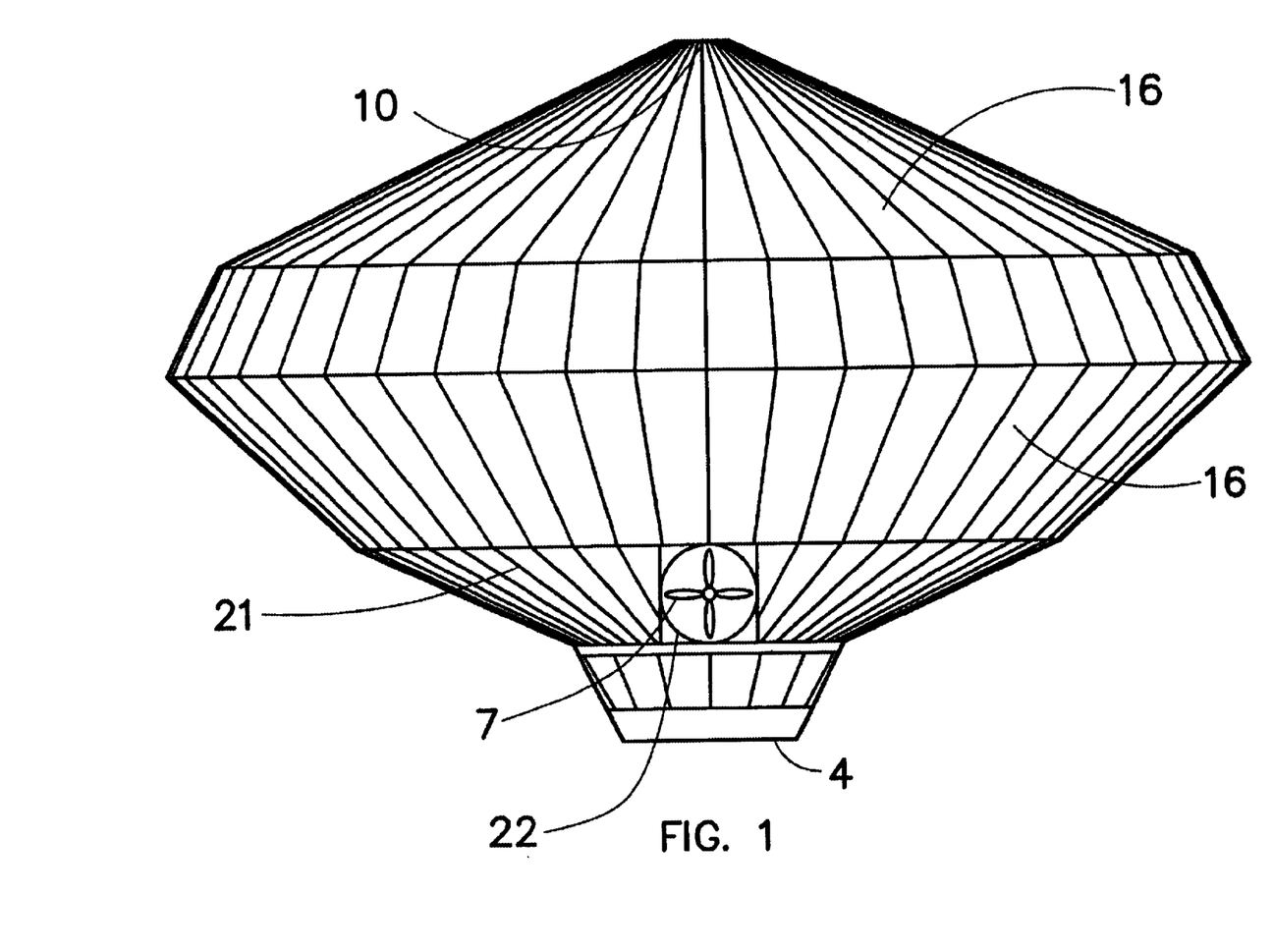
FIG. 1 is a front elevational view of the airship of the present invention, in accordance with a preferred embodiment.
Figure 6:
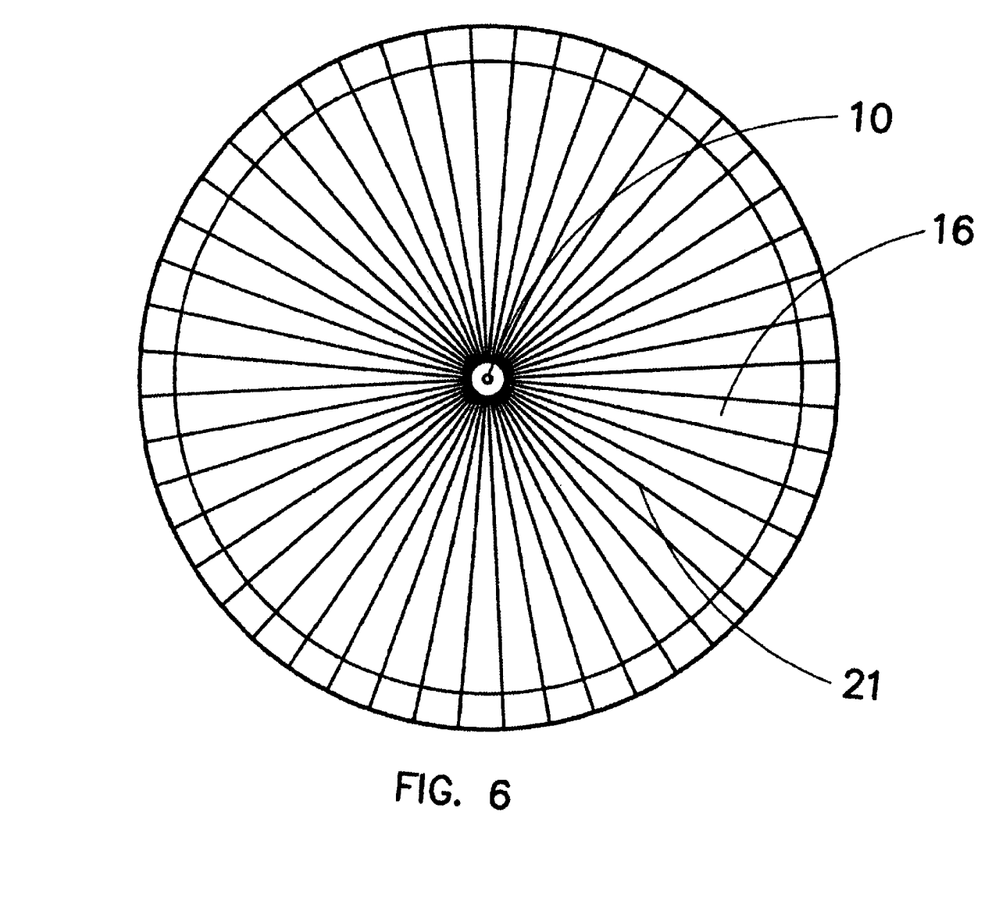
FIG. 6 is a top plan view of the airship.
Figure 10:
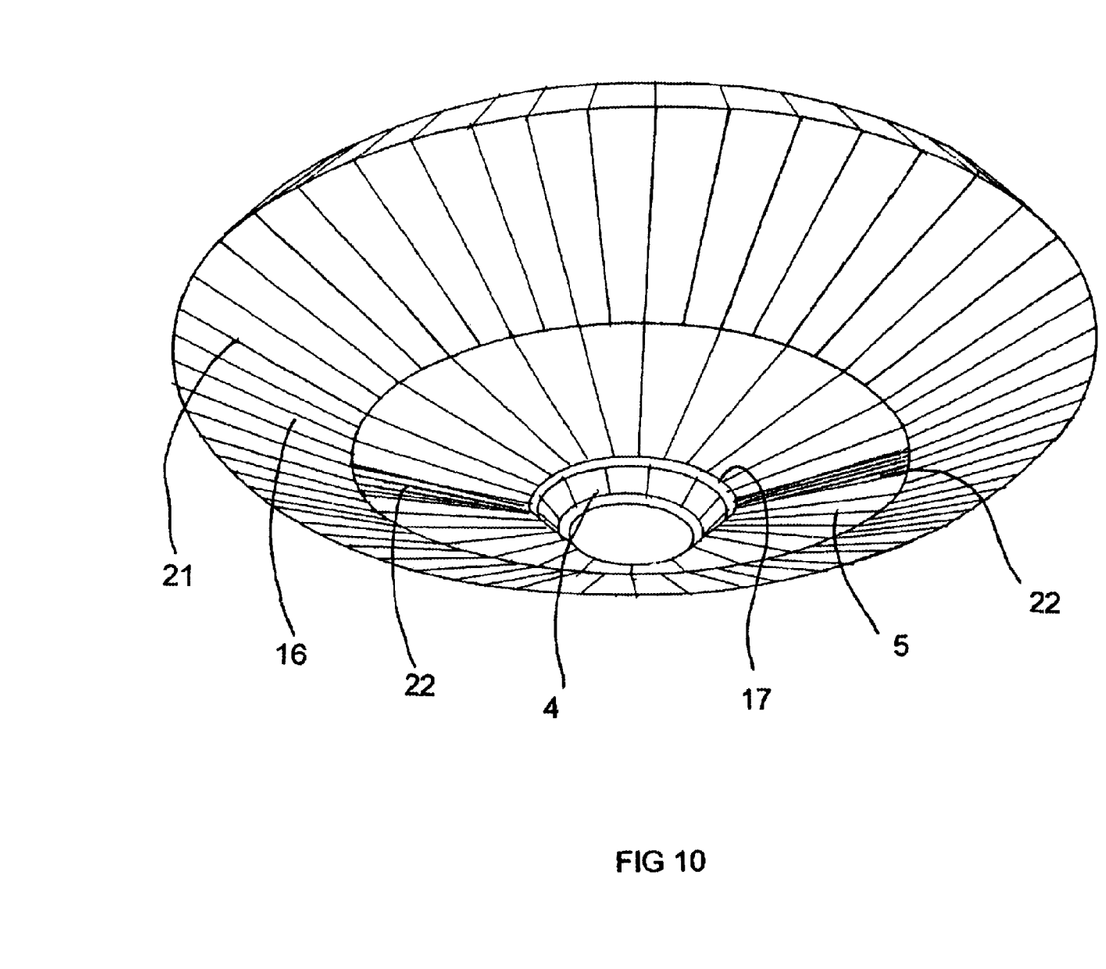
FIG. 10 is an isometric view of the underside of the airship in flight.

Referring to FIGS. 1 and 10, which show the airship, the envelope 16 dominates the view. Inside the envelope 16 are one or more gas bags 1 (see FIG. 3) for containing the lifting gas. The airship is circular in plan view (see FIG. 6). Consequently, a single gas bag 1 can be utilized, although if preferred, several gas bags 1 could be used. Suspended below the envelope 16 is an equipment deck 17 (see FIG. 3). The equipment deck 17 serves as a platform for supporting the propulsion equipment and other equipment as well as the energy source. The equipment deck 17 also has a duct 22 extending fore and aft. Inside of the duct 22 is a fan 7 for propulsion, as well as control surfaces 3, 12 and 13. Below the equipment deck 17 is a gondola 4 for the pilot, passengers and any cargo.

The lifting gas can be helium, although other lifting gases, such as hydrogen, can be utilized.

The energy source can be hydrocarbon fuels such as gasoline, diesel, etc., or it can be a battery storing electricity.

The lifting gas bag 1 is able to contain the lifting gas at pressures exceeding 1.05 times atmospheric pressure, without loss due to molecular filtration. The lifting gas bag can be made of nylon film, PVC, HDPE, or other thin film material, whose molecular structure will contain the lifting gas molecules. Recent experiments at NASA in the ULDB program (ultra long duration balloon) have created helium containing balloon envelopes constructed of only thin nylon film using delicate reinforced seaming methods. Nylon film is known to contain small molecular gasses such as helium at relatively high pressures in balloons. Although nylon film can withstand enormous tension forces, once the material is damaged or starts to rip, it loses almost all structural integrity. Consequently, the thin film material is preferably laminated to a light weight rip stop nylon scrim for strength. Furthermore, the invention protects the nylon film by imparting all surface tension forces of the lifting gas bag 1 to the envelope 16, in a manner analogous to a balloon being inflated inside of a pillowcase.

The outer envelope 16 is constructed of commonly available high-strength, ultraviolet-light-resistant fabric. The fabric is similar to that currently used to construct large shade and hail protection fabric awnings as are commonly used on automotive sales lots. For example, the fabric can be single ply mesh, with 10 cords per inch. The cords are nylon treated with a UV resistant coating such as TEDLAR. The fabric lets air and rain through, but blocks most sunlight and can withstand very high wind loads.

The thin film gas bag 1 does not experience tension forces as the volume of the lifting gas bag and the structural fabric envelope 16 become equal. The outer envelope or hull 16 determines the maximum expansion limits of the thin film lifting gas bag 1 and also the shape of the aircraft and therefore the volume will not fluctuate due to pressure. Unlike conventional airships and experimental balloons, the airship of the present invention does not rely on the strength of the construction seams or material of the lifting gas bag 1 to carry any load, wherein these "stretch" forces are transferred to the structural fabric envelope hull 16 when the gas bag 1 is pressurized. The shape of the airship is therefore rigid by pressure.

Figure 2:
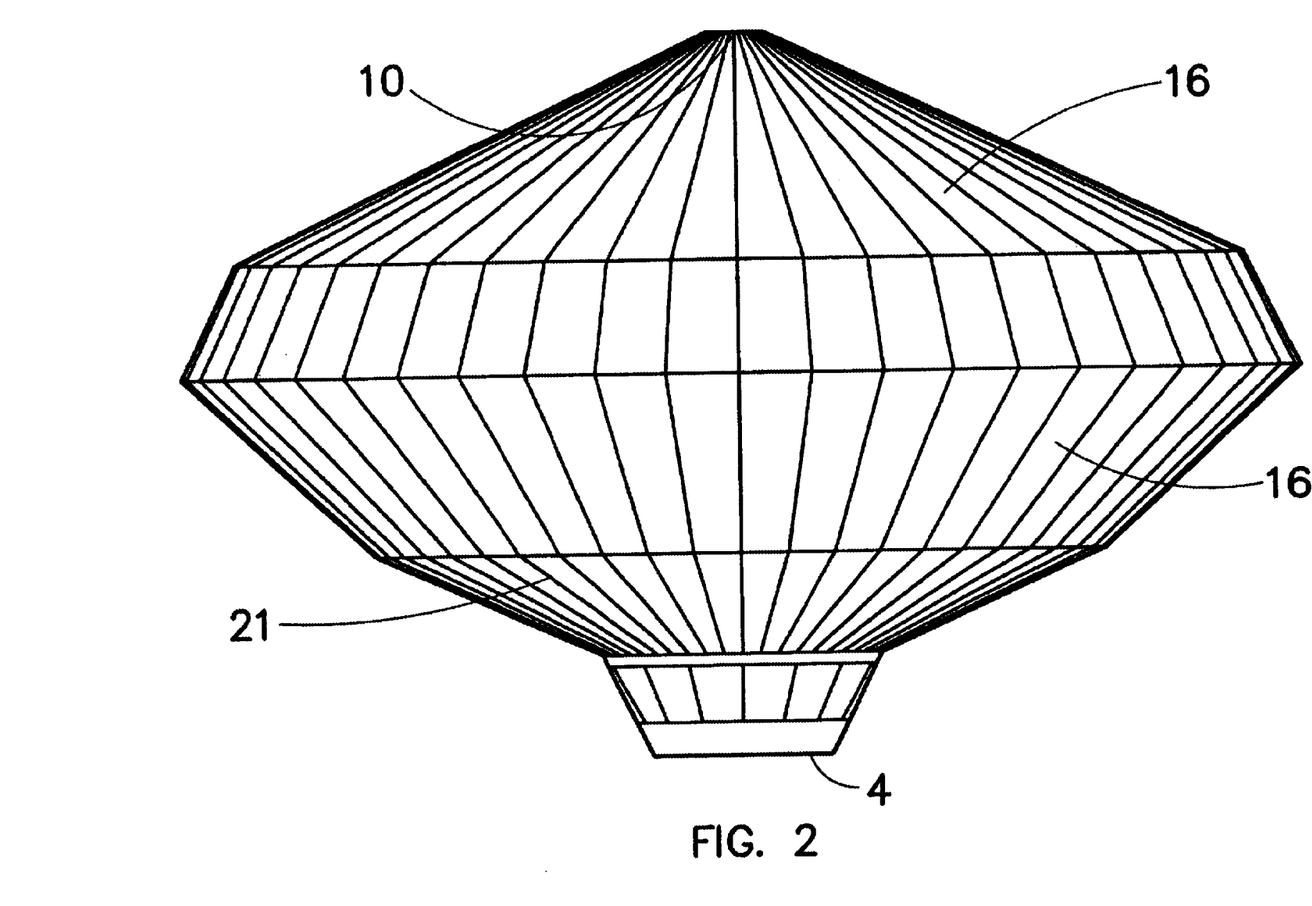
FIG. 2 is a side elevational view of the airship.
Figure 3:
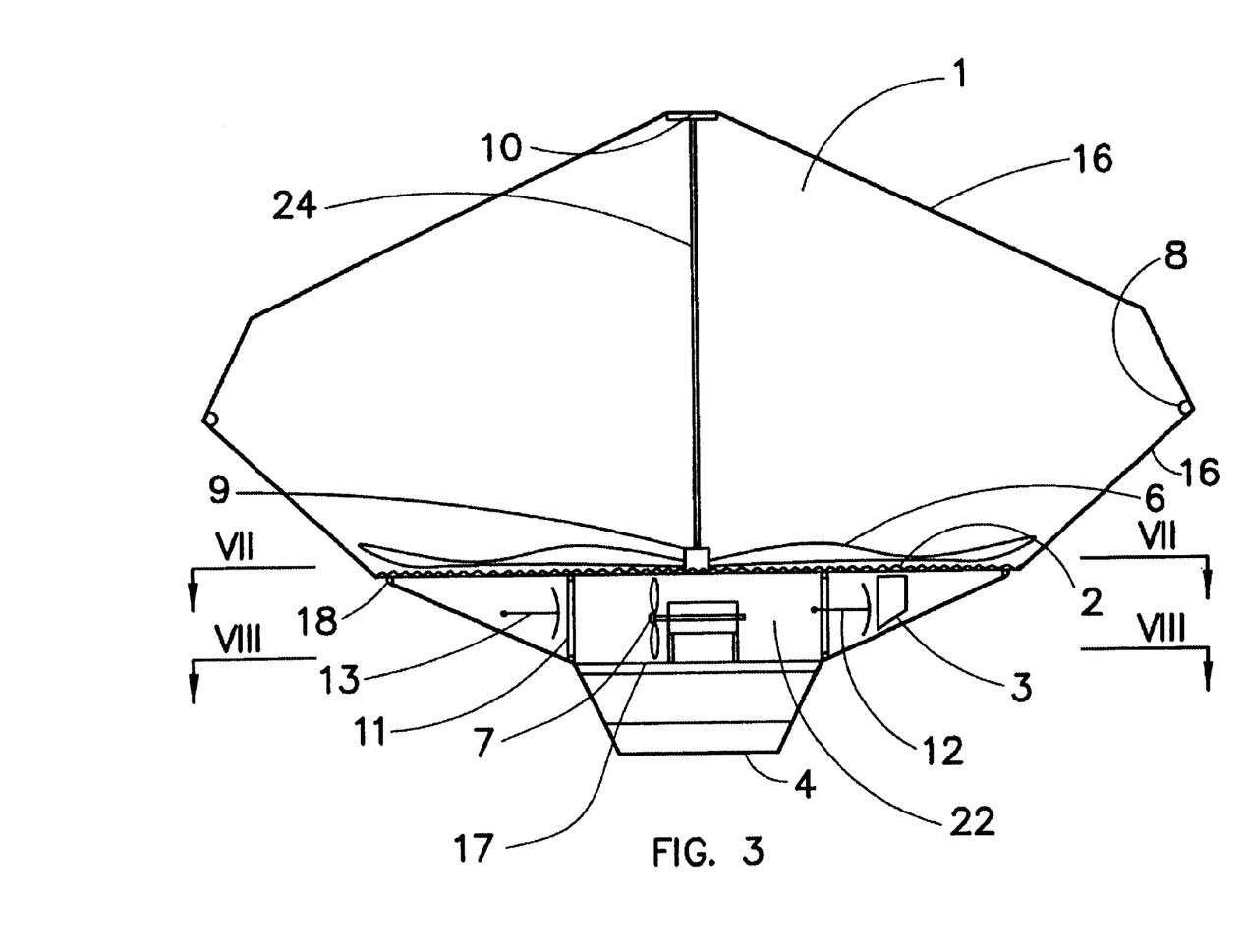
FIG. 3 is a vertical cross-sectional view of the airship from the side, showing the air bag diaphragm in the deflated position.

The discoidal shape of the outer envelope 16 is maintained by a compression ring 8 (FIG. 3). The compression ring 8 is hollow so as to be light in weight and so as to contain a gas. The ring 8 is made of aluminum or a lightweight composite material. Load tapes 21 (FIGS. 2 and 6) are connected to an upper centrally located connection plate 10. The load tapes 21 extend radially outward from the connection plate 10 to the compression ring 8 and thence downwardly to the outer periphery of the sandwich deck 2. The load tapes 21, which are made of structural fabric such as nylon webbing, are coupled to the outer tension ring 18 of the sandwich deck 2. The ends of the tapes are wrapped around the ring 8 and secured to the bight of the tape by stitching or rivets. When the aircraft is inflated with the lifting gas, the load tapes 21 will evenly transfer both the lifting gas forces as well as the dead load and payload (such as the gondola 4) of the aircraft to the compression ring 8 in a similar manner as do spokes on a bicycle wheel. Load tapes 21 are optional depending on the selection of the type of structural fabric for the envelope 16.

Figure 7:
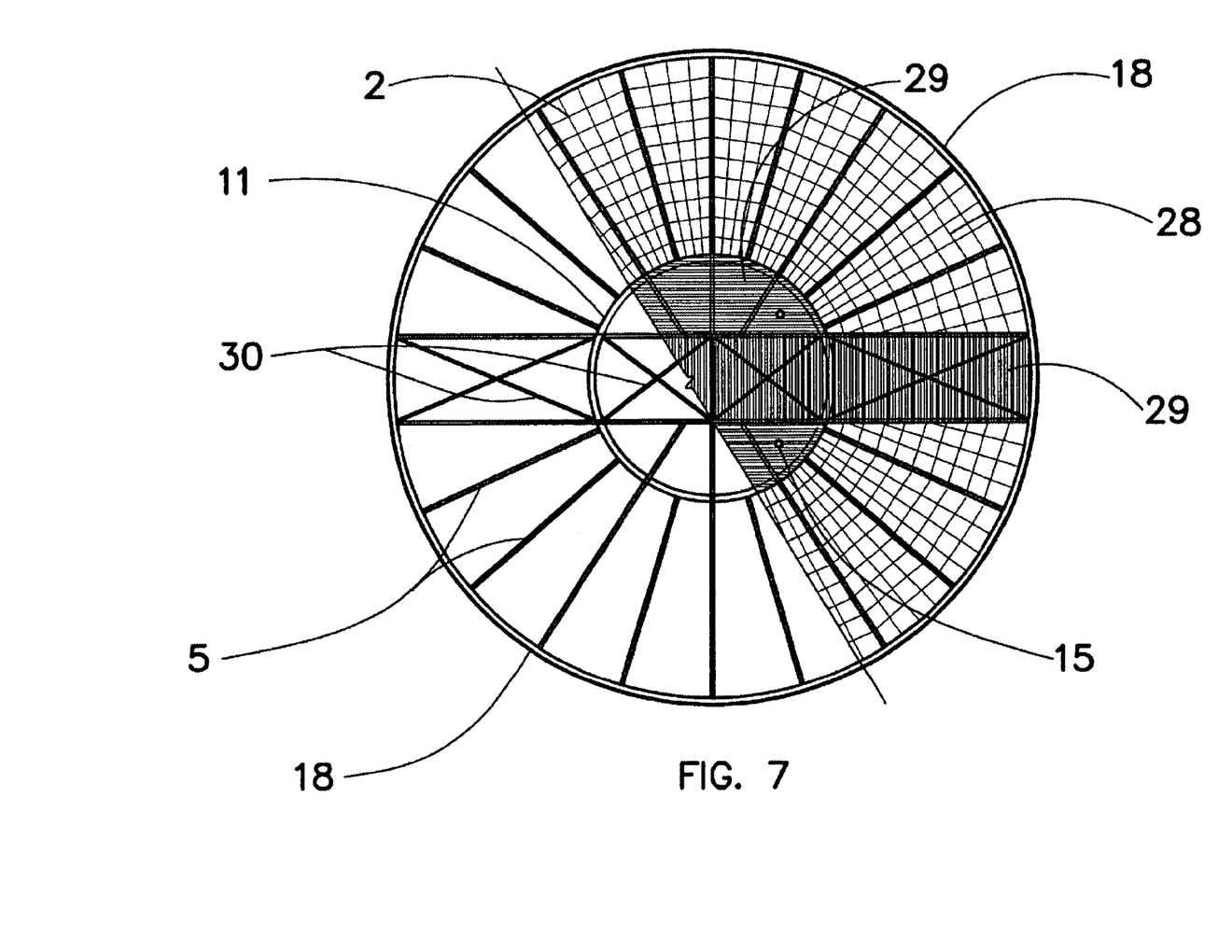
FIG. 7 is a plan view of the sandwich deck with a cut-away showing the structural members under the deck material, taken through lines VII—VII of FIG. 3.

FIG. 7 is a plan view of the sandwich deck 2. Triangular rigid frames 5 (see FIG. 5) extend radially outward from an inner radial truss 11 and connect to an outer tension ring 18. The area inside of the inner radial truss 11 is covered with rigid decking 29. This area overlays the equipment deck 17 (see FIG. 3). In addition, the port and starboard areas overlaying the propulsion tube 22 are covered with rigid decking 29. Struts or cables 30 provide additional structural support. A network of webbing or fabric 28 infills the remaining spaces between the angular frames 5. The webbing 28 not only resists the forces created by the pressure variations in the gas bag 1 but is also important in venting the outer envelope 16 in case of a catastrophic loss of lifting gas, in which case, the shape of the aircraft, and the pendulum nature of the gravitational loads will cause the airship to react as a parachute descending to the ground.

The outer perimeter of the sandwich deck 2 is formed by a tension ring 18, to which the outer hull structural fabric 16 is connected. This deck 2 supports the downward forces created by the pressure variance within the lifting gas envelope 16 and also serves as a structural diaphragm to the airframe. Angular structural members 5 radiate outward from the radial truss 11 to align with the connections of the load tape 21 on the tension ring 18. These structural members 5 act in compression to support the dead load of the aircraft in the parked (heavier than air) condition, and act in tension when the craft is lighter than air.

When the gas bag 1 is inflated, the envelope 16 and the load tapes 21 overlay the top of the gas bag and take the lifting load, which load is transferred to the compression ring 8. Likewise, the dead load and payload of the decks 2, 17, 4 are transferred to the compression ring 8 by the envelope 16 and the load tapes 21. With the dead load of the deck 5 below the gas bag, the crafts is stable in flight and when moored. Rocking perterbations in the craft will dampen.

Figure 4:
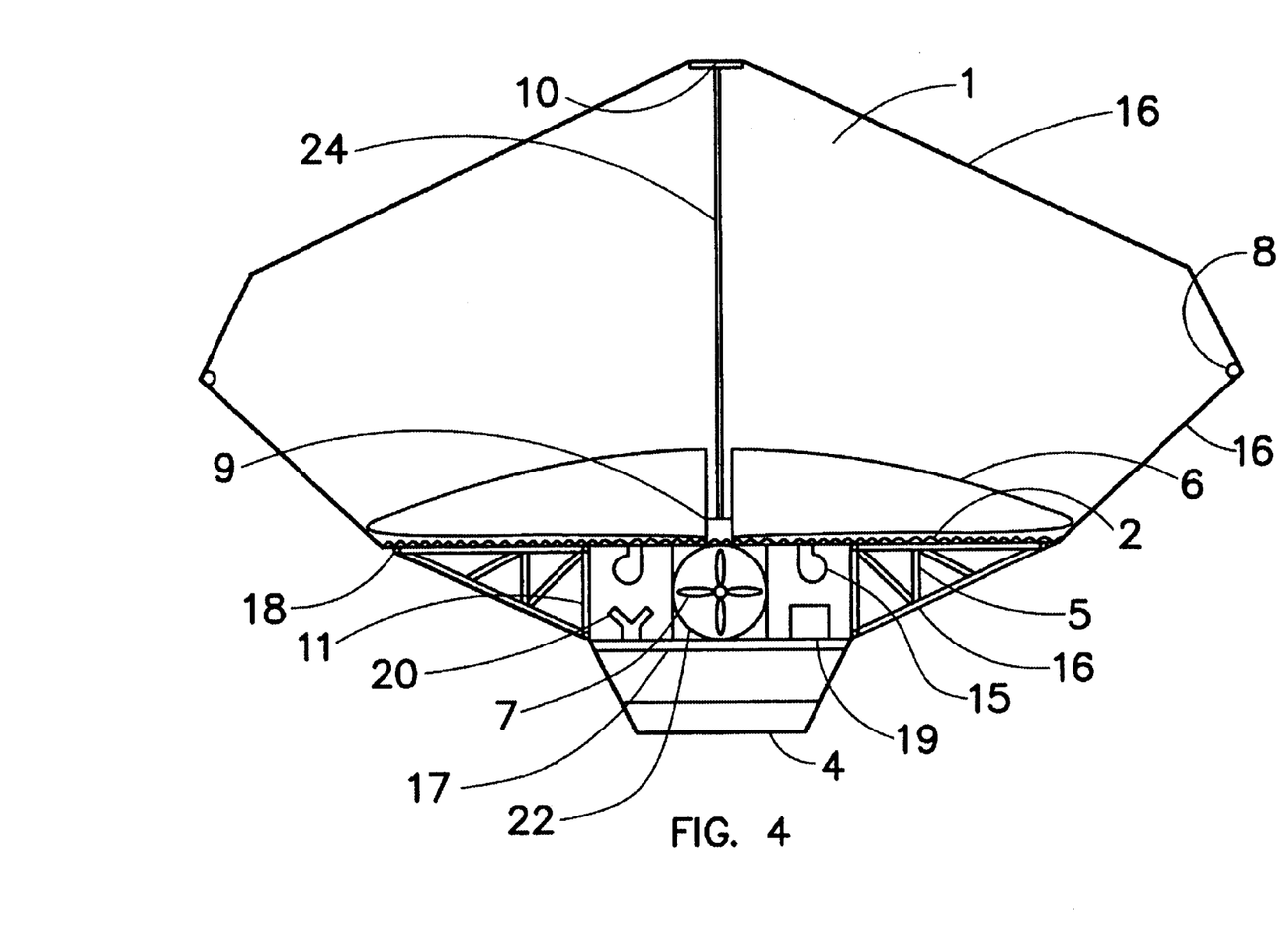
FIG. 4 is a vertical cross-sectional view of the airship from the front, showing the air bag diaphragm in the inflated position.

One or more inflatable bags 6, or ballonets, are located between the sandwich deck 1 and the gas bag 1 (see FIG. 4). The bag 6 can be inflated with blowers 15 and deflated.

The sandwich deck 2 is supported above the equipment deck 17 by frames 5 and trusses 11 (see FIG. 4). The equipment deck 17 has rigid decking 29 attached to horizontal structural members, which are connected to the radial truss 11, as shown in FIGS. 4 and 8.

Figure 8:
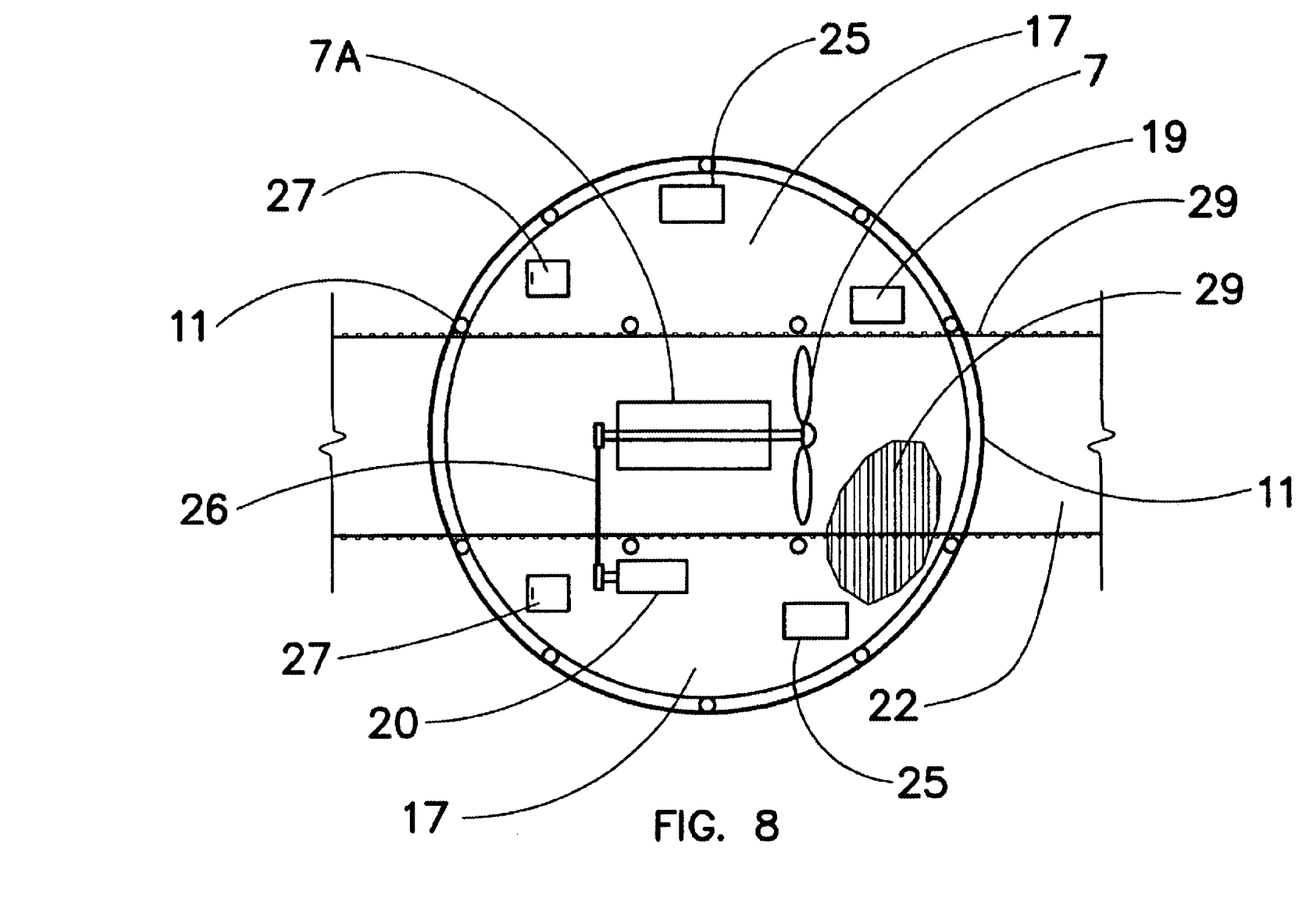
FIG. 8 is a plan view of a portion of the equipment deck, taken through lines VIII—VIII of FIG. 3.

FIG. 8 is a plan view of the equipment deck 17 depicting locations of various items. The equipment deck 17 is bisected by the propulsion duct 22, which is partially shown in FIG. 8. The propulsion duct 22 is rigid. Hatchways 27 allow the pilot or crew to access either side of the equipment deck 17 from the gondola 4, located beneath the equipment deck. Fuel tanks 25 are located on either side or both sides of the propulsion duct 22. The rigid deck 29 can be an aluminum corrugated decking or skin (FIG. 8 only shows a portion of the decking 29). An auxiliary generator 19 and a gas compressor 20 are located on the equipment deck 17. The fan 7 and its corresponding engine 7A are located inside of the propulsion duct 22. The engine 7A has a power take off in the form of drive belts 26, which are used to operate the gas compressor 20. A clutch can be provided between the engine 7A and the gas compressor 20.

The conventional motor driven ducted fan 7 is located in the rigid propulsion duct 22 and provides propulsion. This rigid framed tube 22 also acts as a box girder in forming a key structural element or keel of the airship. Propulsion can also be provided by a conventional jet engine, or other types of propulsion devices.

The perimeter of the equipment deck 17 is defined by the radial truss 11 forming the deck enclosure. The truss 11 extends from the perimeter of the equipment deck 17 upwardly to the sandwich deck 2, as shown in FIG. 4. The flight control surfaces 3, 12 and 13 are located outside of the radial truss 11.

FIG. 3 shows a cross-sectional view fore and aft through the propulsion duct 22. The propulsion source 7 is located inside the duct 22 as are the flight control rudder 3, stem lifting plane 12, and bow lifting plane 13. Suspended beneath the equipment deck 17 is the enclosed crew compartment 4 or gondola.

FIG. 4 is a cross-sectional view looking towards the rear, in which angular structural members 5 are attached to the radial truss 11. The airship equipment includes a generator 19, blower fans 15, and compressor 20, which are mounted in the equipment deck 17.

Controlled flight for the aircraft is achieved by locating conventional controlled surfaces at the inlet and outlet of the propulsion duct 22. Horizontal flight control is provided by the rudder 3 (FIG. 3), which is located in the rear part of the propulsion duct 22. Vertical flight control is provided by a plurality of lifting planes 12, 13 which are located in both the inlet and outlet of the propulsion duct 22. The rudder 3 rotates the airship in either horizontal direction for 360 degrees, and can reverse the craft's direction in flight. The primary vertical flight control is provided by the rear horizontal lifting plane 12. Vertical lift is augmented by placing both of the lifting planes 12 and 13 in the lift orientation. Upward or downward force is dependent on the thrust of the propulsion unit 7. The design will allow the aircraft to take off or land while being several hundred pounds over buoyancy and horizontal flight is sustained by the aerodynamic lift imparted to the airship's shape. Thus, the hull 16 acts as a lifting body while in flight. Controls for the rudder 3 and planes 12, 13 are in the gondola 4.

The airship's secondary vertical flight control system is provided by the inflatable air bag 6 positioned between the lifting gas bag 1 and the deck 2 in a sandwich type manner. When the airship's lifting gas system is at full lift capacity, the inflatable air bag 6 is deflated or flaccid as shown in FIG. 3, and the lifting gas bag 1 is inflated to only about 1.5 times atmospheric pressure. To control vertical lift of the airship during landing procedures, this air bag 6 is inflated with outside air at ambient temperature by means of a plurality of high velocity or high pressure fans 15 (similar to commercial electric leaf blowers). Automatic portal dampers (not shown), or valves, will control the intake and discharge of the air ballast into and out of the gas bag 6. As the air bag 6 is inflated with ambient air, the vertical lift is reduced in two ways. First, the compressed air will weigh more than the ambient air and acts in the same manner as adding ballast to the aircraft. Second, the air bag 6 acts as a bladder to increase the pressure in the lifting gas bag 1 by reducing the available volume for lifting gas inside of the envelope or hull 16. As the pressure in the air bag 6 is increased, the lifting gas pressure will also increase to the same pressure and at the same rate. As the pressure inside the gas bag 1 is increased, then the atmospheric displacement of the lifting gas is reduced and the airship will therefore reduce altitude until the weight of the airship is equal to the weight of the displaced air. Atmospheric pressure varies with altitude and the airship will therefore seek an atmospheric pressure that yields the equal displacement by weight. Level flight and constant altitude can be maintained by modulating the pressure in the air bag 6 or the airship can merely float at a selected ambient air pressure which will vary slightly for many atmospheric related reasons.

Tertiary vertical flight control is provided by a lifting gas management and conservation system. The compression ring 8 is a hollow tube that serves as a receiver for the compressed lifting gas, which eliminates the need to discharge or purge any amount of lifting gas to achieve reduced lift or a ground parked position. The compressor 20, which is mounted on the equipment deck 17, compresses the lifting gas to greater than 200 psig (pounds per square inch gauge) and at 300 CFM (cubic feet per minute). The compressed lifting gas is stored in the compression ring 8, thereby reducing the displacement or lift provided by the lifting gas and adding weight to the compression ring 8. By compressing the lifting gas and storing it in the compression ring 8, together with simultaneously adding additional pressure to the diaphragm air bag 6, vertical flight control is achievable over a wide range of temperatures and altitudes and can also compensate for the cargo and passengers which can then be safely off loaded. To reduce vertical lift, gas is removed from the bag 1, and is compressed by the compressor 20 and stored inside ring 8. To increase vertical lift, gas is released from the ring 8 into the gas bag 1. The gas will expand when moving from the ring 8 to the bag 1. The gas receiver compression ring 8 will be equipped with auto blow down valves to discharge condensate water, which is accumulated through the compression cycles. The compression ring will accommodate up to ten percent (10%) of the total amount of lifting gas at 200 psig. Other hollow framework within the airship can also be used as a receiver or gas storage vessel.

Figure 9:
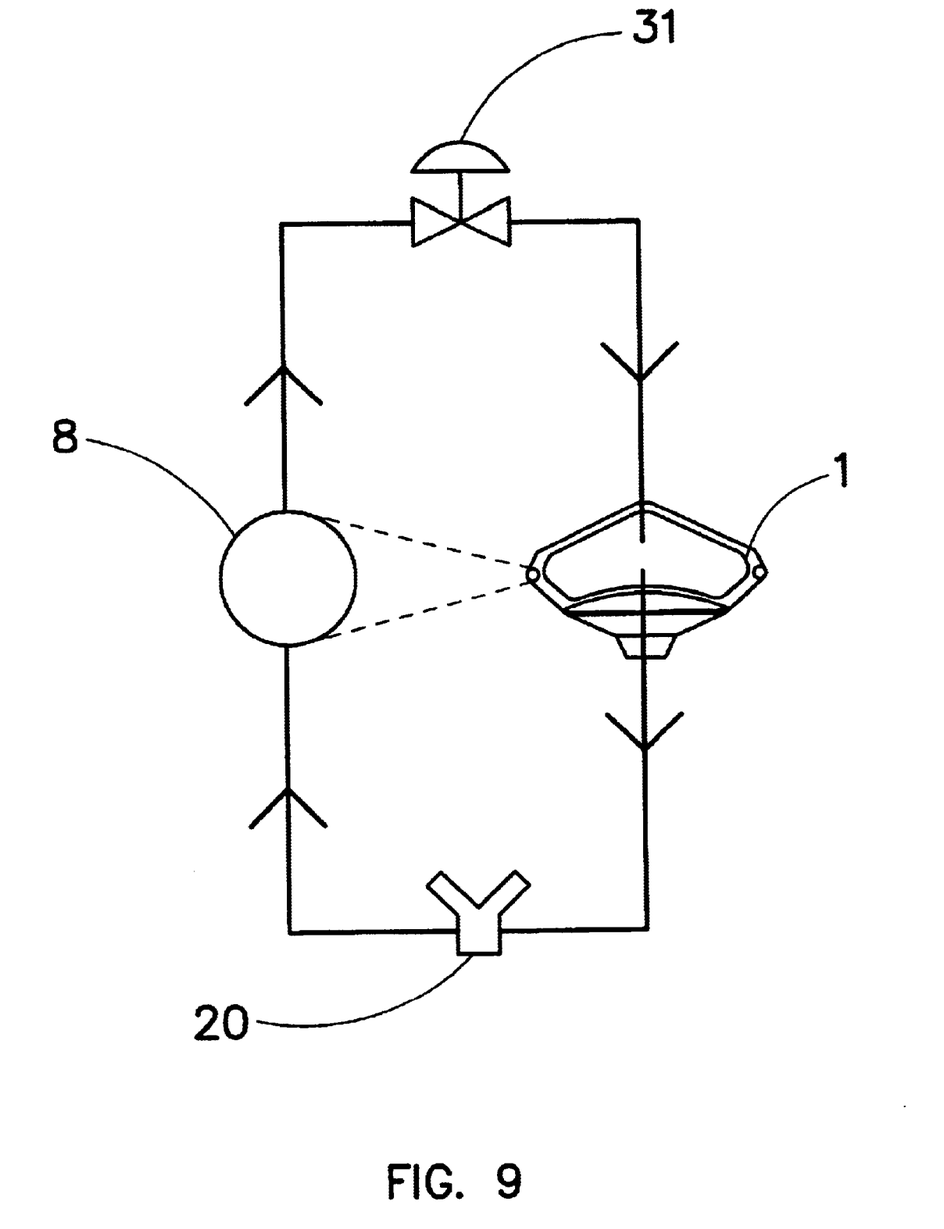
FIG. 9 is a schematic drawing of the lifting gas management system.

FIG. 9 shows the piping and gas flow in schematic format for the lifting gas management system. The gas compressor 20 compresses the lifting gas from the lifting gas bag 1 and provides it to the compression ring 8. A modulating pressure reducing valve 31 controls the release of lifting gas back into the lifting gas bag 1, as needed and directed by the pilot. As higher altitude and higher temperature variations increase during flight, the pressure in the lifting gas bag 1 can be reduced to more efficient levels, as the gas compressor 20 will transfer lifting gas to the radial compression ring 8. Lower altitudes and lower temperatures will require the pilot to release lifting gas back into the lifting gas bag 1 so that maximum displacement of ambient air is maintained. Lifting gas is not purged or lost during the flight cycle.

Figure 5:
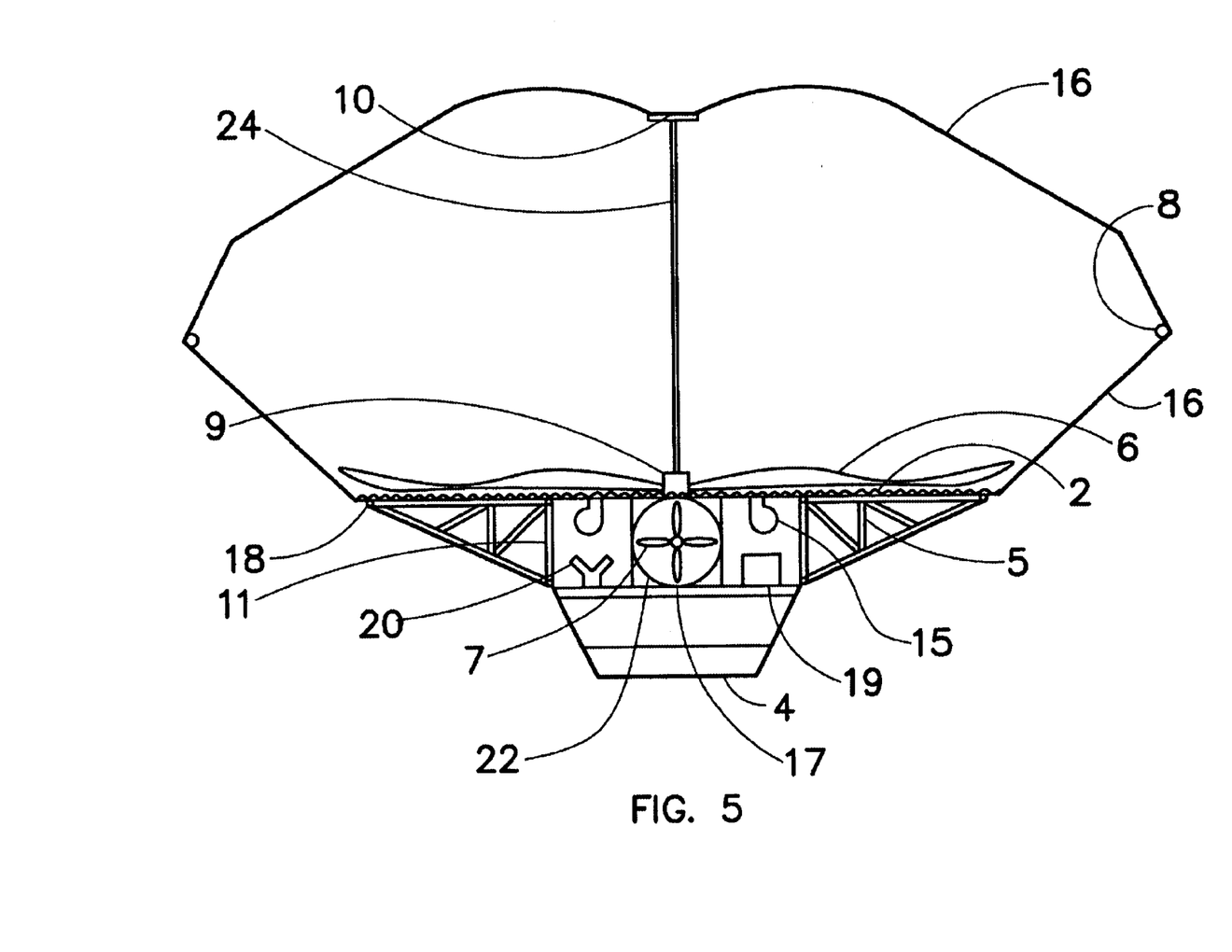
FIG. 5 is the same as FIG. 4, but showing the deformed gas bag in a tertiary compression mode.

Quaternary vertical flight control is provided by deforming the outer envelope 16, as shown in FIG. 5. The airship incorporates a mechanical means for deforming and compressing the gas bag 1. Located within the lifting gas bag 1 is an electric motor winch 9, to which a cable 24 is attached to the upper envelope termination plate 10. The electric motor winch 9 is connected through the air bag 6 and fixed to the sandwich deck 2. When the winch motor is engaged, the top termination plate 10 is drawn downward to reduce the volume of the outer hull or envelope 16 and therefore increase the pressure of the lifting gas in the gas bag 1. The top of the envelope 16 assumes the shape of a pumpkin. The increased pressure and reduced volume of the gas bag 1 is directly proportional to the reduction in the atmospheric displacement, and the airship will seek a lower altitude. Reversing the winch motor 9 will reduce the pressure and increase the volume of the gas bag 1 and therefore increase the lift on the airship. The pressure control system is supplied with electric current from the airship's primary batteries so as to be operational even if the propulsion or electric power generating system is inoperative. The control cable 24 can also be manually operated from the crew compartment. The pressure control system can be used not only to control vertical lift or descent, but to trim the shape of the envelope 16 to provide maximum aerodynamic lift during horizontal flight, and also minimize aerodynamic drag at higher speeds.

Immediate off loading of passengers and cargo is facilitated by sticking the airship to any paved surface similar to the way a suction cup or child's play dart will stick to smooth surfaces. The bottom ring 14 attached around the crew compartment 4 flooring is constructed of flexible rubber so as to form a flexible skirt. When the airship lightly touches a paved surface, the pilot engages the electric suction fan 23 which will evacuate the small volume of air that is captured between the ground and the crew compartment floor. The semi-rigid foam ring 14 will conform to the pavement's surface allowing the suction fan to create negative pressure exceeding 7 pounds per square foot. This immediate suction effect will compensate for off loading between 500 to 800 pounds from the airship. The amount of suction force needed will vary depending on the diameter of the bottom ring 14 and the negative pressure developed by the suction fan 23. The suction fan 23 can be powered by either the primary electrical system and the auxiliary generator 19.

One of the key features in the airship is the ability to perform repetitive landings and takeoffs without the need for service or replenishment of any kind, allowing the airship to deliver many consecutive payloads. In addition, the structural design, the shape and the lifting gas management features allow greater air speed over a substantial altitude range.

The airship is different from traditional blimp type airships in that it can land, park and unload passengers and cargo without the need of a mooring mast or concern that the airship will take off or blow away when unloaded.

The ability to land and take off or hover gives the airship many uses. The craft can hover over a body of water and can land on the water for pleasure, fishing or scientific research. Adding a sea anchor sail allows the craft to drift over the water for indefinite time without the use of the propulsion system.

The airship will be able to maintain much greater air speed than traditional lighter-than air aircraft due to it's lower weight, the rigid by pressure characteristics during flight and the aerodynamic leading edge and shape of the craft.

The hovering capability of the airship can be accomplished at much less fuel consumption than rotary blade aircraft or current lift augmented aircraft and will allow the user to stay aloft for many hours, even days.

The airship can be deployed as a mobile communications platform for military or rural applications. Hovering at 18,000 feet, the invention can provide communications for hundreds of square miles at a fraction of the cost for networked ground based towers or conventional flying machines.

The airship's shape together with the vented fabric hull will allow the safe and reasonable use of hydrogen as a lifting gas.

The airship and passengers can survive even though the lifting gas bag has suffered a catastrophic rupture. If all of the lifting gas is lost in flight, then the airship will become its own parachute by virtue of the shape of the compression ring and the vented outer structural envelope, together with the pendulum nature of the dead loads. In addition, the propulsion system can be trimmed for full power vertical lift to soften the emergency landing.

The airship can be used to safely haul hazardous or toxic waste, using routes over the least populated areas. The airship will offer a safer mode of freight transfer than any other ground or air transportation in current use.

The airship is simple to assemble from a minimum of six premanufactured assemblies including the lifting gas source. These are: 1) the fabric hull 16, 2) the lifting gas bag 1, 3) the air diaphragm bag 6, 4) the radial triangular frames 5 and 5) the rigid frame assembly comprised of the crew compartment 4, the equipment deck 17, the radial truss 11, the propulsion tube 22 and the deck 2. The rigid frame assembly also includes the propulsion unit and all other equipment such as the generator, fuel tanks, pumps, fans and controls. The invention can be field assembled anywhere or disassembled and transported to remote locations.

The airship can be configured as a "leader ship" that can control a plurality of drone freight carriers in a caravan or convoy manner. The airship can be enlarged in simple fashion to allow cargo loads exceeding 10,000 pounds.

In the preferred embodiment, the compression ring will be 80 feet in diameter and the airship will be 40 feet in overall height, although the ship need not be limited to these dimensions. The size and simplicity of the airship make it ideal for a personal pleasure craft or recreational vehicle. The craft's controls and motion through air is more like a submarine in water than other airborne vehicles. Persons with minimal training and basic navigation skills can safely operate the airship.

The foregoing disclosure and showings made in the drawings are merely illustrative of the principles of this invention and are not to be interpreted in a limiting sense.

What is claimed is:

1. An airship, comprising:
    a) a gas bag for containing lifting gas, the gas bag being located within an outer envelope;
    b) a reservoir of compressed lifting gas, the reservoir being in selective communication with the gas bag;
    c) a compressor for compressing the lifting gas from the gas bag and providing it to the reservoir; and
    d) a controller for moving the lifting gas from the reservoir to the gas bag;
    e) the reservoir comprising a hollow horizontal ring located around the gas bag, the ring being coupled to the envelope, the ring supporting a deck located below the gas bag.

2. The airship of claim 1 wherein the deck comprises a propulsion unit and vertical and horizontal flight control surfaces.

3. The airship of claim 1 further comprising means for providing a suction between the deck and the ground for landing.

4. The airship of claim 1 wherein the envelope comprises a flexible sheet material.

5. The airship of claim 1, further comprising:
    a) a rigid frame located below the gas bag;
    b) an expandable diaphragm located between the rigid frame and the gas bag;
    c) an air injector for expanding the diaphragm and compressing the gas bag.

6. The airship of claim 5 wherein the envelope is flexible, further comprising means for changing the shape of a top portion of the envelope.

7. The airship of claim 1 wherein the envelope is flexible, further comprising means for changing the shape of a top portion of the envelope.

* * * * *